July 14, 1970     L. SCHLEBUSCH     3,520,408
VIBRATING SCREEN ASSEMBLY
Filed Sept. 25, 1969     3 Sheets-Sheet 1
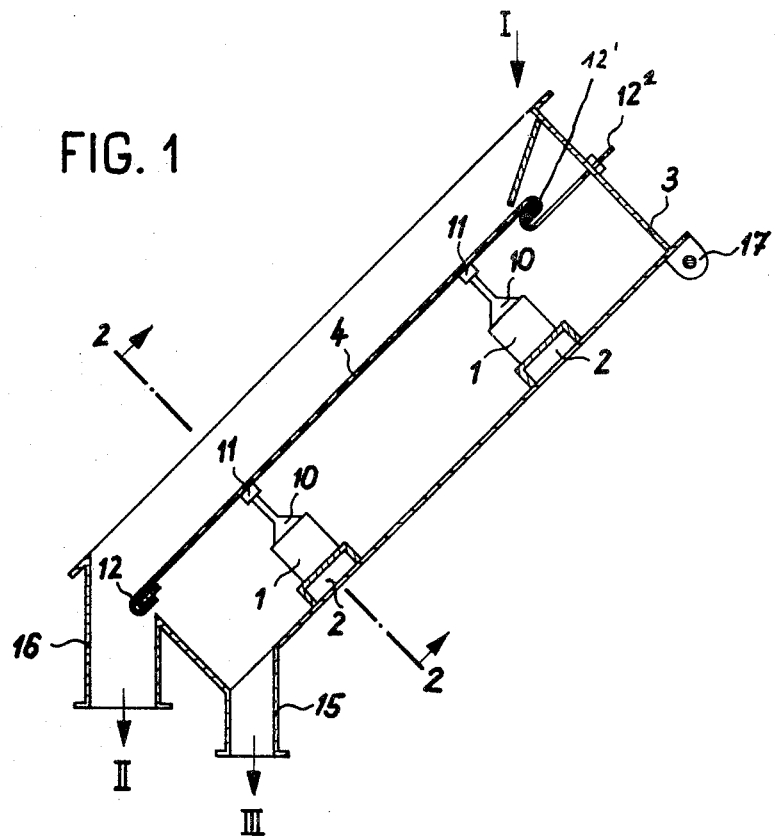
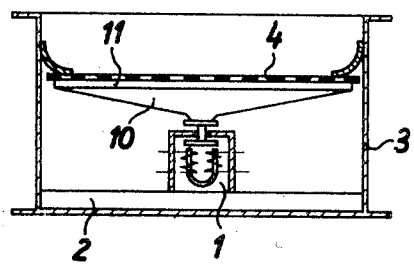
INVENTOR
LUDWIG SCHLEBUSCH
BY Stevens, Davis, Miller & Mosher
ATTORNEYS FIG. 3
FIG. 4
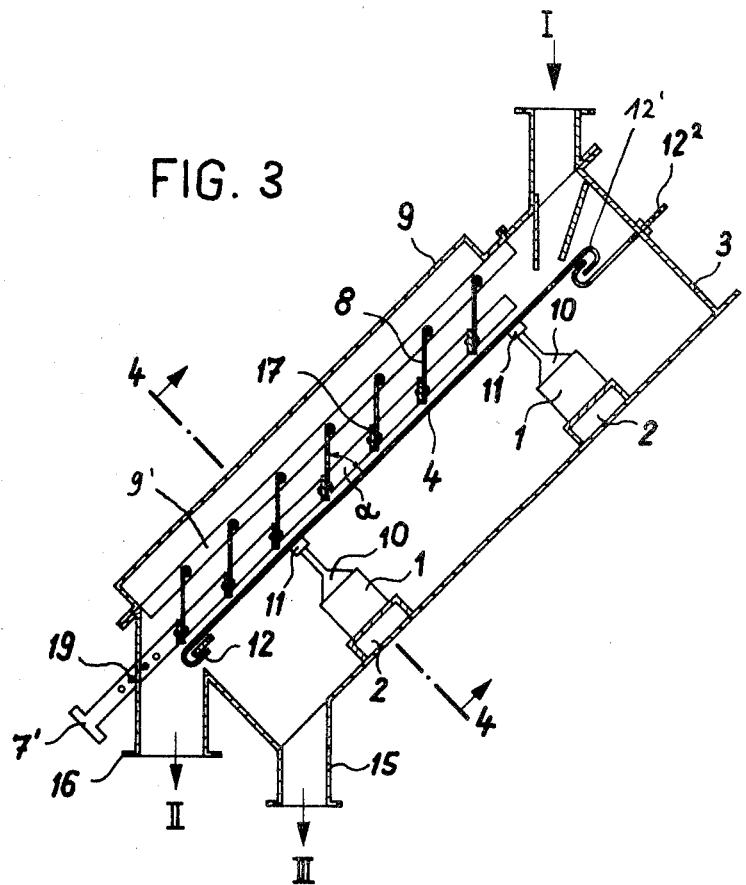
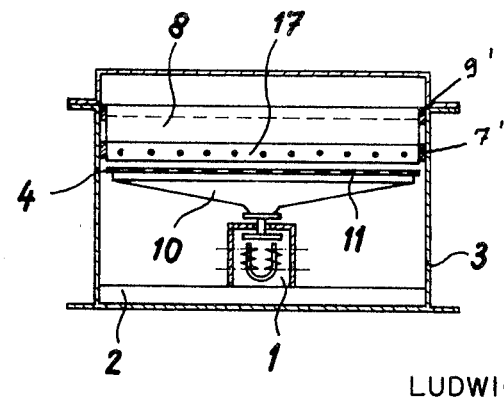
INVENTOR
LUDWIG SCHLEBUSCH

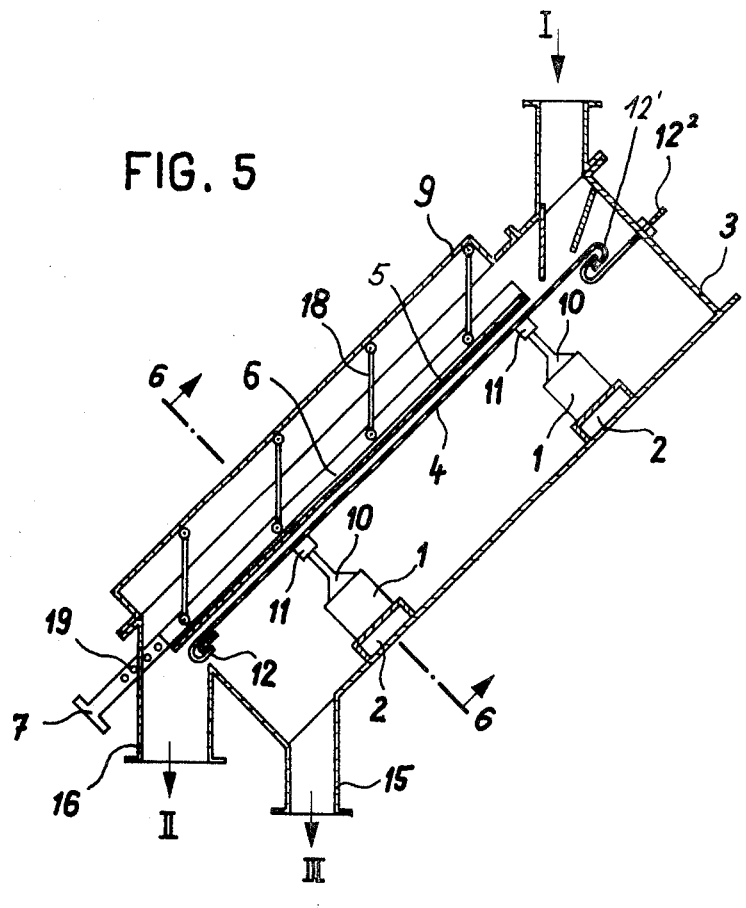
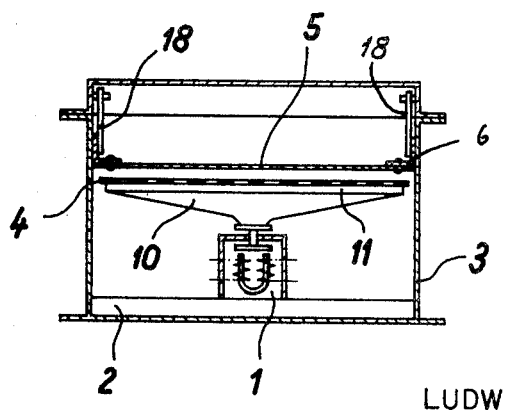

United States Patent Office 3,520,408
Patented July 14, 1970

3,520,408
VIBRATING SCREEN ASSEMBLY
Ludwig Schlebusch, Mulheim (Ruhr), Germany, assignor to Siebtechnik G.m.b.H., Mulheim (Ruhr), Germany
Continuation-in-part of application Ser. No. 686,588, Nov. 29, 1967. This application Sept. 25, 1969, Ser. No. 860,895
Claims priority, application Germany, Dec. 5, 1966, S 107,263; Dec. 27, 1966, S 107,620
Int. Cl. B07b 1/34
U.S. Cl. 209—267          13 Claims

ABSTRACT OF THE DISCLOSURE

A vibrating screen assembly comprising a screen clamped within a housing between an inlet opening and a discharge opening extending through the housing. At least one vibrating cross bar extends transversely to said screen and engages the bottom portion thereof. Rebounding members are mounted above the screen and are adjustable to change the spacing between the screen and rebounding members.

---

The present application is a continuation of my earlier application Ser. No. 686,588 filed Nov. 29, 1967, now abandoned.

BACKGROUND OF THE INVENTION

Field of the invention

The present invention relates to a screen assembly of the swinging type, and, more particularly, to such an assembly in which the screen bottom is vibrated. Rebounding members are spaced above the screen to limit the bouncing of the material being screened.

Description of the prior art

In known vibrating screen assemblies, many difficulties arise with regard to the increase of the output of the screen and the self-cleaning thereof, particularly when a wet, fine grained material is treated.

In order to overcome these difficulties it has been suggested to utilize tappets, or the like, which are distributed over the screen bottom and which are reciprocated to subject the screen to vibration. However, in this arrangement, unequal vibrations of the screen are obtained, particularly near the periphery thereof. This is especially true if the screen, which may be in the form of a fabric, is firmly clamped on all sides by clamping devices distributed over its entire periphery. Also, with a clamping connection between the tappets and the screen bottom, a replacement of the screen is difficult and costly due to the fact that such a connection must be effected at numerous places along the screen. Further, these numerous connections weaken the structure.

There have been other proposals in which there is neither a clamping nor an actuating connection between the tappets and the screen bottom. However, in addition to causing an undesirable secondary crushing of the screened material, the tappets in this arrangement must engage the screen bottom over a distance in which the latter is very heavily stressed.

It has also been proposed to provide a transversal bracing of the screen and a linear excitation thereof in the conveying direction of the screened material. Here too the connection is rendered more difficult, and the swinging amplitudes decrease to zero on the longer parts of the screen only.

It has further been proposed to vibrate the screen by longitudinal cross bars, on which some transversal cross bars are rigidly fastened, the transversal cross bars in turn being fixed to the screen bottom. However, the transversal cross bars are not adjustable during service and do not produce a uniform tension in the screen. Also, if the assembly is not exact, unequal vibrations are created, resulting in an unequal treatment of the screened material and possible damage to the screen fabric.

Also, since a directly excited screen can swing only vertically to its level, a considerable inclination of the screen is required in order to obtain an acceptable conveying speed. On the other hand, in order to increase the screen output, in particular with materials difficult to be screened, the acceleration of vibration is chosen relatively high. Furthermore, with directly excited screen bottoms, the layer of material on the screen must not be too high, for otherwise, the vibrations of the screen will be dampened excessively. This results in the screend material being thrown very high and passing, in a few jumps, over the entire length of the screen. However, if the inclination of the screen is reduced, the screening of the limit-size grain is indeed better, because of the high jumps, the great number of vibrations of the excitation is not fully utilized, and the conveying speed drops disproportionately.

An attempt has been made to solve the above problem by providing a drag apron of elastic material, such as rubber, immediately behind the place of delivery of the material to be screened with the material extending for a considerable length upon the screen. However, by such a drag apron, the vibrations of the screen were considerably dampened, and it was therefore proposed to put the apron itself into vibrations by additional exciters. Besides the costliness of this latter solution, it involves the disadvantage that soft material to be screened is crushed between the screen and the drag apron. Furthermore, hard limit-size grain would be pressed so firmly into the meshes that it could not be extracted.

SUMMARY OF THE INVENTION

It is therefore an object of the present invention to create a vibrating screen assembly which overcomes the above disadvantages in the known arrangements.

It is another object of the present invention to vibrate a uniformly stretched screen in a uniform manner essentially over its entire surface, including the periphery thereof extending parallel to the conveying direction of the material on the screen, in order to obtain a uniformly conveying and working screening surface.

Briefly summarized, the device of the present invention includes a vibrating screen disposed in a housing and having a screen clamped near its end in the general longitudinal driection of the housing. A plurality of vibrating members act on the screen bottom through cross bars extending transversely to the stretching and conveying direction. Due to the fact that only the transversal cross bars are in engagement with the screen bottom, a sparing treatment both of the material to be screened and of the screen member itself is obtained.

Furthermore, in connection with the clamping of the periphery of the screen, the transversal cross bars preferably extend over the total width of the screen bottom to ensure a uniformly conveying and working screening surface, which surface extends onto the longitudinal periphery of the screen. As several vibration producers and, consequently, several transversal cross bars acting independently from each other are provided, a very exact adjustment of the tension of the screen is possible.

According to one particular form of the invention, rebounding faces of elastic material, such as rubber or plastic, are adjustably fixed at a relatively small distance over the screen without touching same. In this manner, the performance of the screening machines is considerably increased as a good screening is obtained in spite of a high conveying speed and a relatively large inclination of the screen. Also, the jumps of the screened material from the screen are reduced and the length of the screen is better utilized, due to the fact that the material to be screened is more often directed towards the screen as the material bounces off the rebounding members.

Of course the varying hardness of the material to be screened can be taken into account by the choice of the material, the distance and/or the arrangement of the rebounding faces, etc.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings:

FIG. 1 is a schematic longitudinal sectional view of a vibrating screen assembly of the present invention;

FIG. 2 is a transverse sectional view taken along line 2—2 of FIG. 1;

FIG. 3 is a schematic longitudinal sectional view of a vibrating screen assembly with rebounding faces arranged above the screen;

FIG. 4 is a transverse section taken along line 4—4 of FIG. 3 showing the shape of the rebounding member;

FIG. 5 is a view, similar to FIG. 3, of a modified form of the arrangement of FIG. 3; and FIG. 6 is a transverse section taken along line 6—6 of FIG. 5 showing the shape of the rebounding member.

DESCRIPTION OF THE PREFERRED EMBODIMENTS

Referring to the drawings, and particularly to FIGS. 1 and 2, the reference numeral 3 refers to a screen box having a screen member 4 mounted therein. Box 3 is shown in an inclined position in order to aid in the conveyance of the material to be screened, it being understood that it is swingable about suitable known pivot means into any angular position including one wherein the screen member 4 is horizontal. Of course, the pivot means 17 may be located at one end of the box, as shown, or at any intermediate position.

The screen member 4 consists of one or more screen fabrics disposed upon one another, and is clamped in the longitudinal direction of the box by means of known clamping folds 12 and 12' and J-bolts 12². A pair of vibration exciters 1 are arranged on bridges 2 in the screen box 3, and are applied directly from below to the bottom of the screen member 4. A transverse cross bar 10 is connected to the upper portion of each exciter and each cross bar 10 has an engaging member 11 which is force locked against the bottom of the stretched screen fabric and is of an anti-abrasion material so as to minimize wear on the fabric. "Force locked" is intended to mean a tight fitting relationship between the parts.

The vibration exciters 1 may be alternating current magnets as shown in FIG. 2, it being understood that they could take other forms such as exciters with rotating unbalances. As shown in FIG. 2, the transverse cross bars 10 extend over the entire width of the screen member 4.

Because of the individual force locking of each transverse cross bar 10 to the bottom of the screen member 4 and the individual actuation of the bars, the tension of the screen member can be adjusted exactly according to particular requirements. Also since only two portions of the screen member are clamped by clamping folds 12 and 12', the screen member is easily exchangeable by release of J-bolts 12² from fold 12' and the screen is not interrupted so that one can choose a normal design without thereby rendering the exchange more difficult.

As shown in FIGS. 3 and 4, several rebounding members 8 are suspended in a substantially vertical direction above the screen member 4 so that they form an acute angle $\alpha$ with the plane of the screen member. The width of the rebounding members substantially corresponds to the width of the screen member, and the distance of the individual rebounding members from each other is so chosen that their projections overlap upon the plane of the screen member.

In the above arrangement a particularly soft rebounding of the material to be screened is obtained due to the fact that the rebounding of the material takes place at an angle with respect to the screen member, and to the fact that the rebounding members 8 can yield to a certain extent since they are preferably made of resilient material. Thus, the arrangement shown in FIGS. 3 and 4 is particularly suited to soft material to be screened.

Each of the substantially rectangular rebounding members 8 can be pivotally mounted at one end or side of the screen box cover 9 or on a frame 9' disposed immediately below the cover and at the other end on a common draw bar 7' extending substantially parallel above the screen member 4, and to the end or side thereof so that the rebounding members 8 may be easily moved out of the way in the event the screen member has to be changed or replaced. The draw bar 7' can thus serve to easily change the angle $\alpha$ dependent on the grain size, the humidity, and the hardness of the screened material, etc.

By means of the draw bar 7', the angle $\alpha$ can be fixed, as a function of the screening process to be carried out, by adjustment means 19, for example, pins or teeth which are arranged on the draw bar 7' and in a conventional manner can engage with the wall of the screen housing 3 or the outlet connection 16. The rebounding members 8, which are resilient by virtue of the properties of the material from which they are made, remain substantially stationary during the screening process, after prior adjustment of the angle $\alpha$. The draw bar 7' is fastened by connecting members 17 to the lower end of the rebounding member 8.

In the embodiment shown in FIGS. 5 and 6, there is a substantially flat or plate-shaped elastic rebounding member 5, preferably of rubber or plastic material, which is fastened at a small distance above the screen member 4 on a pendulating suspended frame 6. The distance of the rebounding member 5 from the screen member can be adjusted by means of a draw bar 7 from outside the screen box 3. The draw bar 7 is provided with adjustment means 19 in the same manner as the draw bar 7' of FIG. 3.

As in the arrangements of FIGS. 4 and 5, the rebounding member 5 is fastened by means of a series of support members on the screen box cover 9 or on a frame so that the rebounding member 5 can easily be removed from the screen box 3, as discussed above.

In operation, the material to be screened is delivered to one end of the assembly in the direction of the arrow I as shown in FIGS. 1, 3 and 5 through a suitable feeding socket as shown. In the embodiments of FIGS. 3 to 6 the rebounding members are moved to their proper position by their respective draw bars, and the vibration exciters 1 are actuated to cause the vibration of the screen member 4 and the discharge of the finer material through the screen and discharge port 15. The relatively coarse material is conveyed to the other end of the assembly and is discharged from the apparatus as shown by arrow II through a suitable discharge socket 16.

Of course, variations of the specific construction and arrangement of this type assembly herein disclosed can be made by those skilled in the art without departing from the invention as defined in the appended claims.

What is claimed is:

1. A vibrating screen assembly comprising a housing having a material inlet opening and at least one material discharge opening, a screen member disposed in said housing, means clamping said screen member in said housing between said openings only along the edges thereof lying perpendicular to the direction of conveyance of the material being screened, at least one rigid cross bar extending generally transverse to and across substantially the entire width of said screen member and resting in tension against the bottom portion thereof, means to vibrate said cross bar whereby said screen will be uniformly vibrated throughout its entire area, and means supporting at least one rebounding member in said housing in spaced relationship to the upper surface of said screen member.

2. The apparatus according to claim 1, further comprising means for swinging said housing into any one of a plurality of angular positions with respect to the horizontal.

3. The apparatus according to claim 1, wherein each of said cross bars is provided with anti-abrasion pieces fitted to the bottom of said screen member under tension.

4. The apparatus according to claim 1, wherein said means to vibrate said cross bars comprises alternating-current magnets.

5. The apparatus according to claim 1, wherein said reboundnig member is of an eleastic material.

6. The apparatus according to claim 1, further comprising means to adjust and fix the distance between said rebounding member and said screen member.

7. The apparatus according to claim 6 wherein said adjustment means is operable from outside said housing.

8. The apparatus according to claim 1, wherein said rebounding member is displaceably mounted in said housing.

9. The apparatus according to claim 1, wherein a plurality of rebounding members are arranged at an angle with respect to said screen member, said rebounding members being spaced from each other so that their projections overlap in the plane of said screen.

10. The apparatus according to claim 9, further comprising a draw bar extending parallel to said screen member, one end of each of said rebounding members being mounted on said draw bar, said draw bar having a portion extending outwardly from said housing and being adapted to be moved with respect to said housing to vary the angular position of said rebounding members with respect to said screen member.

11. The apparatus according to claim 10 further comprising means on said draw bar to fix the angular position of said rebounding members.

12. The apparatus according to claim 1, wherein said rebounding member is in the form of a plate member extending parallel to said screen member.

13. The apparatus according to claim 12, further comprising means to adjust and fix the distance of said plate member from said screen member.

References Cited

UNITED STATES PATENTS

| | | | |
|---|---|---|---|
| 923,498 | 6/1909 | Dill | 209—267 X |
| 1,584,017 | 5/1926 | Ditto | 209—368 X |
| 1,864,940 | 6/1932 | Reynolds | 209—368 X |
| 2,354,377 | 7/1944 | Johnson | 209—266 |
| 3,101,314 | 8/1963 | Johnson | 209—403 X |

TIM R. MILES, Primary Examiner

U.S. Cl. X.R.

209—346